(No Model.)
F. McDONOUGH.
LUMBER ASSORTER.
No. 268,810. Patented Dec. 12, 1882.
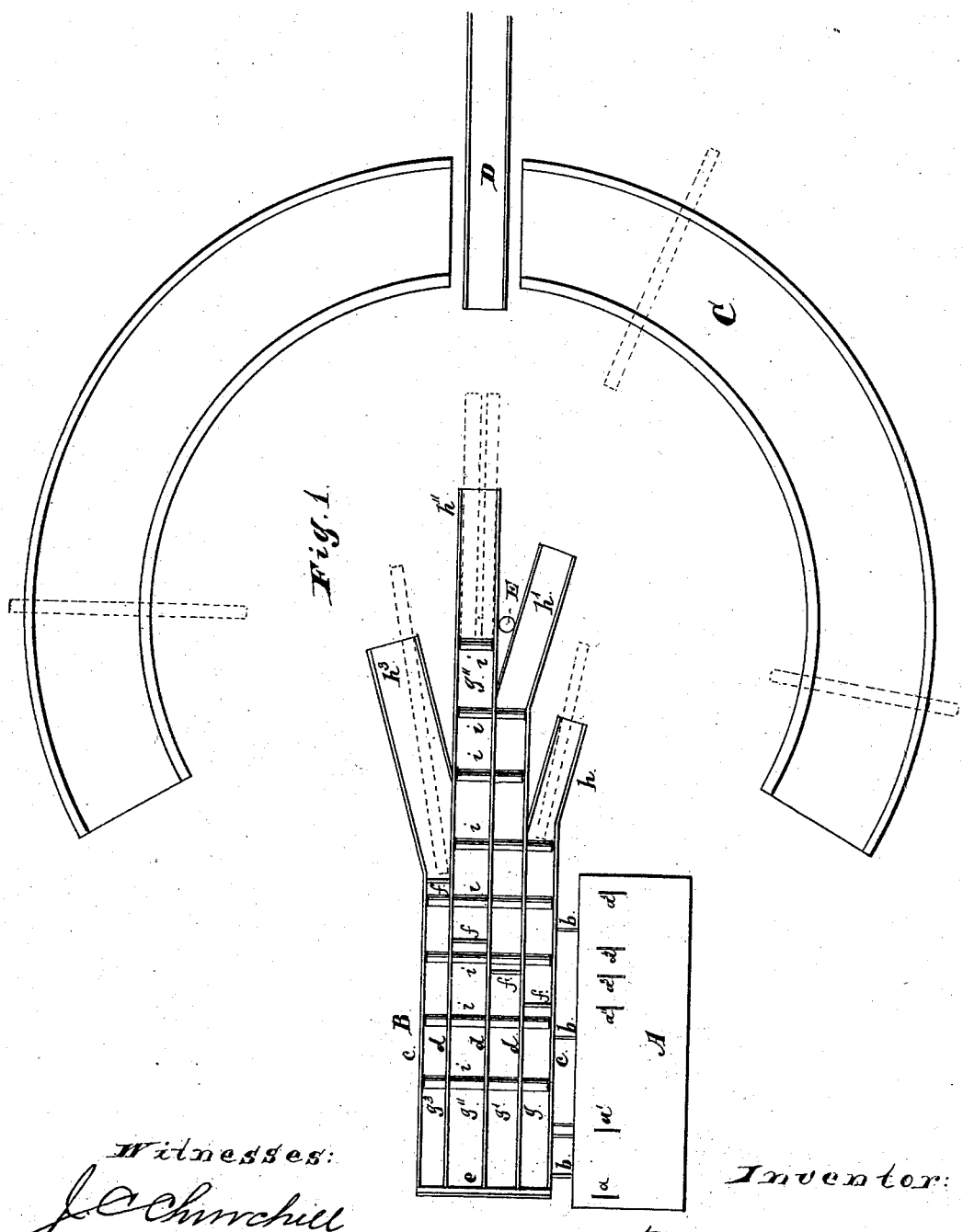

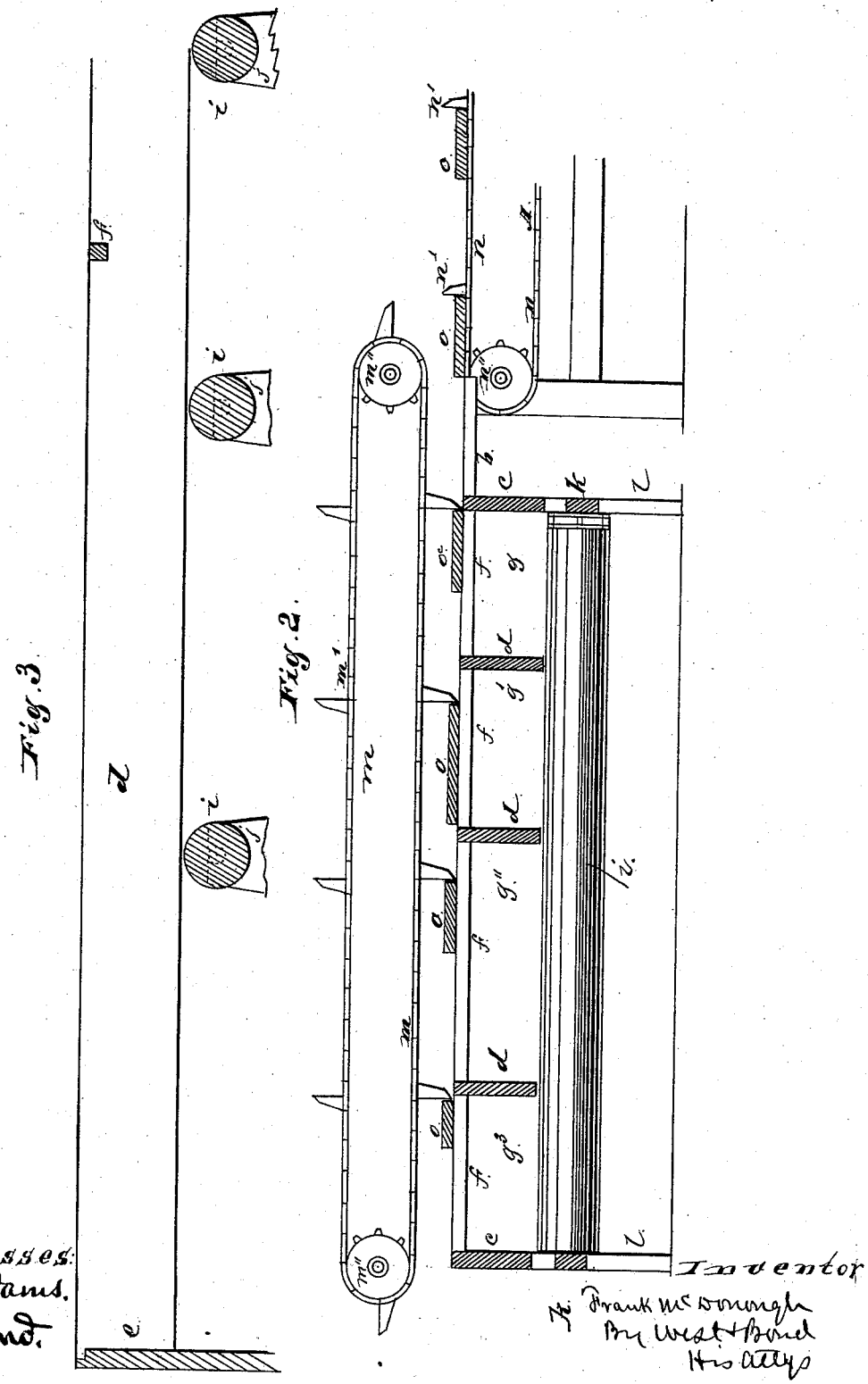

UNITED STATES PATENT OFFICE.

FRANK McDONOUGH, OF EAU CLAIRE, WISCONSIN.

LUMBER-ASSORTER.

SPECIFICATION forming part of Letters Patent No. 268,810, dated December 12, 1882.

Application filed June 12, 1882. (No model.)

*To all whom it may concern:*

Be it known that I, FRANK MCDONOUGH, residing at Eau Claire, in the county of Eau Claire and State of Wisconsin, and a citizen of the United States, have invented new and useful Improvements in Lumber-Assorters, of which the following is a full description, reference being had to the accompanying drawings, in which—

Figure 1 is a top or plan view; Fig. 2, an enlarged cross-section, showing the delivery end of the trimming-machine, and showing also the carrying-chain for delivering the lumber onto the assorting apparatus; Fig. 3, an enlarged detail, showing the arrangement of the carrying-rollers and one section or division of the assorting apparatus.

It is the customary and general practice to use what are known or termed "trimming-machines," consisting of a series of saws arranged at varying distances apart, one saw being stationary and the remainder capable of being raised or lowered to bring them into use or throw them out of use, as required, for trimming the ends of boards or timber of different lengths. In use, owing to the varying conditions of the lumber or other material being cut, no two parts or pieces of the same length are liable to come together and be delivered together from the trimmer, the result being that the boards or other material are delivered in a miscellaneous lot composed of long, short, and intermediate boards or pieces, and the practice has been for the assorters to first take the boards or material and sort them into piles of the same length, and then grade them, requiring an extra amount of handling in sorting the boards or material as they come from the trimmer.

The object of this invention is to construct a machine or device by the use of which lumber or pieces of varying length will be automatically separated and pieces of the same length delivered at a common point, to be there sorted into different grades and in piles to be conveniently rehandled for shipment or other purposes.

To this end my invention consists in the combination, with a machine for trimming lumber, of an apparatus for assorting the different lengths or pieces of lumber as delivered from the trimming-machine, said apparatus consisting essentially of a series of sections or divisions of varying lengths for receiving the trimmed lengths or pieces of timber, and devices for carrying the respective lengths or pieces along the sections or divisions and causing pieces of the same length to pass to the same delivery-point.

The invention embraces other features, which will be fully hereinafter described, and pointed out in the claims.

In the drawings, A represents in outline a trimming-machine having one stationary saw, $a$, and five movable saws, $a'$ $a^2$ $a^3$ $a^4$ $a^5$. This trimming-machine may be of any of the ordinary forms of construction and arrangement, and operates in the usual manner, and is not carried out in detail, as a general outline is all that is necessary to show the relative arrangement between it and the assorter.

B is the assorter, arranged side by side to the trimming-machine, and connected therewith by strips or pieces $b$, which form guides or ways for the lumber or material to travel from the trimmer onto the assorter, the two devices having their upper surfaces in the same horizontal plane, or nearly so. The assorter is formed with two side pieces, $c$, made of board or other suitable material, connected together at one end by a cross-piece, $e$, and supported upon suitable legs or standards, $l$, or in any other suitable manner, to bring its upper face in line, or nearly so, with the upper face of the trimmer. The space between the side pieces, $c$, is divided by partition or division boards $d$, into as many sections or divisions as there are different lengths of board or material cut by the trimmer, as shown. Three partitions, $d$, are provided, forming four sections or divisions, $g$ $g'$ $g^2$ $g^3$, the lengths of which are respectively made a little longer than the length of board cut respectively by the saws $a^2$ $a^3$ $a^4$ $a^5$ by locating a cross-piece, $f$, across the respective divisions at the point for the length of board, as shown in Fig. 1. As many of these sections or divisions of the required length to correspond with the different lengths of board which the trimmer cuts are to be provided. If the trimmer has five working-saws, the assorter will have five sections or divisions; if six working-saws, six sections or divisions, &c.; and these sections or divisions are each to be of sufficient width for the passage of the widest board cut on the trimmer. As shown, the several sections or divisions are lengthened out or continued by extensions $h\ h'\ h^2\ h^3$, formed each of a bottom and side pieces to furnish a guide and support for the lumber or material passing into them, respectively; but such extensions or continuations could be made in some other manner, and arranged differently from the form shown, and as many are to be provided as there are divisions or spaces for the passage of different lengths of material. Below the divisions or sections are arranged a series of rollers, $i$, which may be mounted in the upper ends of standards or posts $j$, as shown in Fig. 3, or be mounted in supporting-pieces, $k$, attached to the legs or supports $l$, as shown in Fig. 2. These rollers may be continuous, extending from side to side of the assorter; or they may be made up of a number of independent rollers corresponding in length to the width of the divisions or sections. As shown, the rollers are continuous and made gradually shorter as the assorter decreases in width beyond the point where the side extensions or continuations, $h\ h'\ h^3$, join the main part of the apparatus. The rollers may be speeded by means of a belt and suitable pulleys, or a driving-chain and suitable spocket-wheels, or in any other suitable manner, and, if desired, a portion of them could be idlers, furnishing simply a traveling support for the boards or other pieces of material, the necessary travel for the board or piece being given by the acting rollers.

C is a platform, of a curved or circular shape, and formed by a bottom and side pieces supported on suitable standards or posts at a height for the easy piling of the lumber or material thereon by the men doing the sorting. As shown, the platform or support is made in two divisions, between the inner ends of which is located a track or roadway, D, for the admission of a wagon, cart, or other vehicle, or cars to be loaded for shipment; and in order to facilitate the handling in loading on to the wagon, cart, cars, &c., a crane located on a post, E, may be provided, the outer end of the crane swinging in a circle within the circular platform, and being provided with suitable pulleys and ropes by means of which a pile of lumber can be encircled, raised, and swung around into position to be deposited on the wagon or car or other receiver. The lumber is carried over the trimming-machine by chains $n$, having teeth $n'$, and running over sprocket-wheels $n^2$, as usual, and after the lumber leaves the trimmer the pieces are engaged by the teeth $m'$ of chains $m$, running over sprocket-wheels $m^2$, located above the assorter and extending transversely across the same, as shown in Fig. 2, the distance between the teeth $m'$ on the chains $m$ corresponding to the distance between the teeth $n'$ on the chains $n$. One or more chains, with their teeth, may be used, as desired.

The operation is as follows: The lumber or pieces to be trimmed are placed on the trimmer and carried forward by the carrying-chains, as usual, and the proper saw raised to trim the end, as usual. The board or piece, after being trimmed, is carried forward by the chain or chains $n$ until it reaches the position to be taken by the chain or chains $m$, which chain or chains carry it forward over the assorter. If the saws $a^2\ a^3\ a^4\ a^5$ are arranged to cut twelve, fourteen, sixteen, and twenty feet boards or pieces, the spaces or divisions $g\ g'\ g^2\ g^3$ will be respectively about two inches longer than the length of board cut by the respective saws $a^2\ a^3\ a^4\ a^5$. As the pieces are carried forward by the chains it will be seen that the pieces cut by the saws $a$ and $a^2$ will, as they reach the division or section $g$, drop therein and pass down onto the rollers $i$, to be moved along and discharged at the end of such section; that the pieces cut by the saws $a$ and $a^3$ will pass over the section $g$, and drop into the section $g'$ onto the rollers $i$, and be taken to the end of such section; that the pieces cut by the saws $a\ a^4$ will pass over the sections $g\ g'$ and drop into the section $g^2$ onto the rollers $i$, and be taken to the end of such section; and that the pieces cut by the saws $a\ a^5$ will pass over the sections $g\ g'\ g^2$, and drop into the section $g^3$ onto the rollers $i$, and be taken to the end of such section. The end of the board cut in each case by the saw $a$ will pass onto the support or end piece, $e$, while the opposite ends cut by the other saws will clear the respective cross-pieces $f$, and drop so that the movement of the rollers will draw the end off from $e$, and it will be seen that the ends cut by the saws $a^2\ a^3\ a^4\ a^5$ cannot drop except at the space or section with which they coincide, because the end will overlap the cross-piece of the shorter sections.

As shown, a saw, $a'$, is located on the trimmer; but no space corresponding thereto is provided in the assorter. The pieces cut by such saw can pass into the section $g$, or another section be added therefor. When delivered at the ends of the respective sections the men who do the sorting can readily and quickly take the pieces as they come, sort them into different grades, and pile them on the platform C or other place of deposit without paying any attention to the assorting of the lengths, as the pieces deposited from the same section are of the same length in each instance.

The crane on the post E can be dispensed with, if desired, but will be found useful in assisting to load the material on the cart, car, or wagon, or other transporting means.

As before stated, where more saws are used than shown, a corresponding number of sections or divisions in the assorter can be provided.

What I claim as new, and desire to secure by Letters Patent, is—

1. The combination, with a lumber-trimming machine, of an apparatus for assorting the different lengths of lumber as delivered from the trimming-machine, said apparatus consisting of a series of sections or divisions of varying lengths for receiving the trimmed lumber, and devices for carrying the respective lengths of lumber along the sections or divisions and causing pieces of the same length to pass to the same delivery-point, substantially as described.

2. The combination, with a lumber-trimming machine, of an apparatus for assorting the different lengths of lumber, consisting essentially of a series of sections or divisions of varying lengths, arranged at one side of the trimming-machine, a carrier for taking the trimmed lumber and delivering it to the sections or divisions, and devices for carrying the pieces along the respective sections or divisions and delivering pieces of the same length at a single delivery-point, substantially as described.

3. The combination, with a lumber-trimming machine, of an assorter, B, having division-strips $d$ and cross-pieces $f$ to form spaces of varying length, a delivery chain or device located above the divisions, and delivery-rollers located below the divisions for delivering lumber or pieces of the same length to a common point, substantially as specified.

4. The combination, with a lumber-trimming machine, A, of an assorter, B, divided into spaces of varying lengths by strips $d$ and cross-pieces $f$, and having end continuations or extensions at the delivery end of the divisions or sections, and chain or chains located above the divisions, and rollers located below the divisions for separating and delivering different lengths of lumber or pieces, substantially as described.

5. The combination, with a lumber-assorter, B, of a curved platform or receiver, C, for readily assorting lumber into different grades and piling the same in position for ready handling, substantially as described.

FRANK McDONOUGH.

Witnesses:
W. P. BARTLETT,
J. C. CHURCHILL.